United States Patent [19]

Moreau

[11] 4,199,849
[45] Apr. 29, 1980

[54] METHOD OF AND MACHINE FOR MANUFACTURING SUPPORT GRIDS FOR STORAGE BATTERY ELECTRODE PLATES

[75] Inventor: Jean-Pierre Moreau, Le Grand Quevilly, France

[73] Assignee: Baroclem S. A., Courbevoie, France

[21] Appl. No.: 894,917

[22] Filed: Apr. 10, 1978

[30] Foreign Application Priority Data

Apr. 18, 1977 [FR] France .................................. 77 11627

[51] Int. Cl.² .............................................. B26D 7/16
[52] U.S. Cl. .......................................... 29/2; 83/268;
83/396; 83/395; 83/415
[58] Field of Search .............. 29/2; 83/903, 129, 130,
83/268, 396, 391, 394, 395, 415, 732; 72/420,
421, 461

[56] References Cited

U.S. PATENT DOCUMENTS

| 2,253,280 | 8/1941 | Lormor | 83/268 X |
|---|---|---|---|
| 2,638,982 | 5/1953 | Winkel | 29/2 X |
| 2,963,931 | 12/1960 | Lamoureux | 83/268 X |
| 3,051,030 | 8/1962 | Winkel | 29/2 X |
| 3,310,973 | 3/1967 | Leis | 72/461 X |
| 3,830,121 | 8/1974 | Makeev et al. | 83/415 X |

*Primary Examiner*—Horace M. Culver

[57] ABSTRACT

Method and machine for manufacturing grids from lead-based metal for use in storage batteries of the type wherein a casting is first performed of grid blanks the periphery of which is irregular and the size greater than that of the grid to be obtained, these blanks being thereafter cut out in an automatic press. In view to increase the rate of output of the press and to improve the quality of the grids, the press is supplied sequentially from a continuous grid-blank feeding conveyor and at least one final lateral centering of the grid blank is performed in the press by the combined action of two pusher members tapping on each side of the grid blank in a transverse direction passing substantially from the center of mass of the grid blank.

14 Claims, 4 Drawing Figures

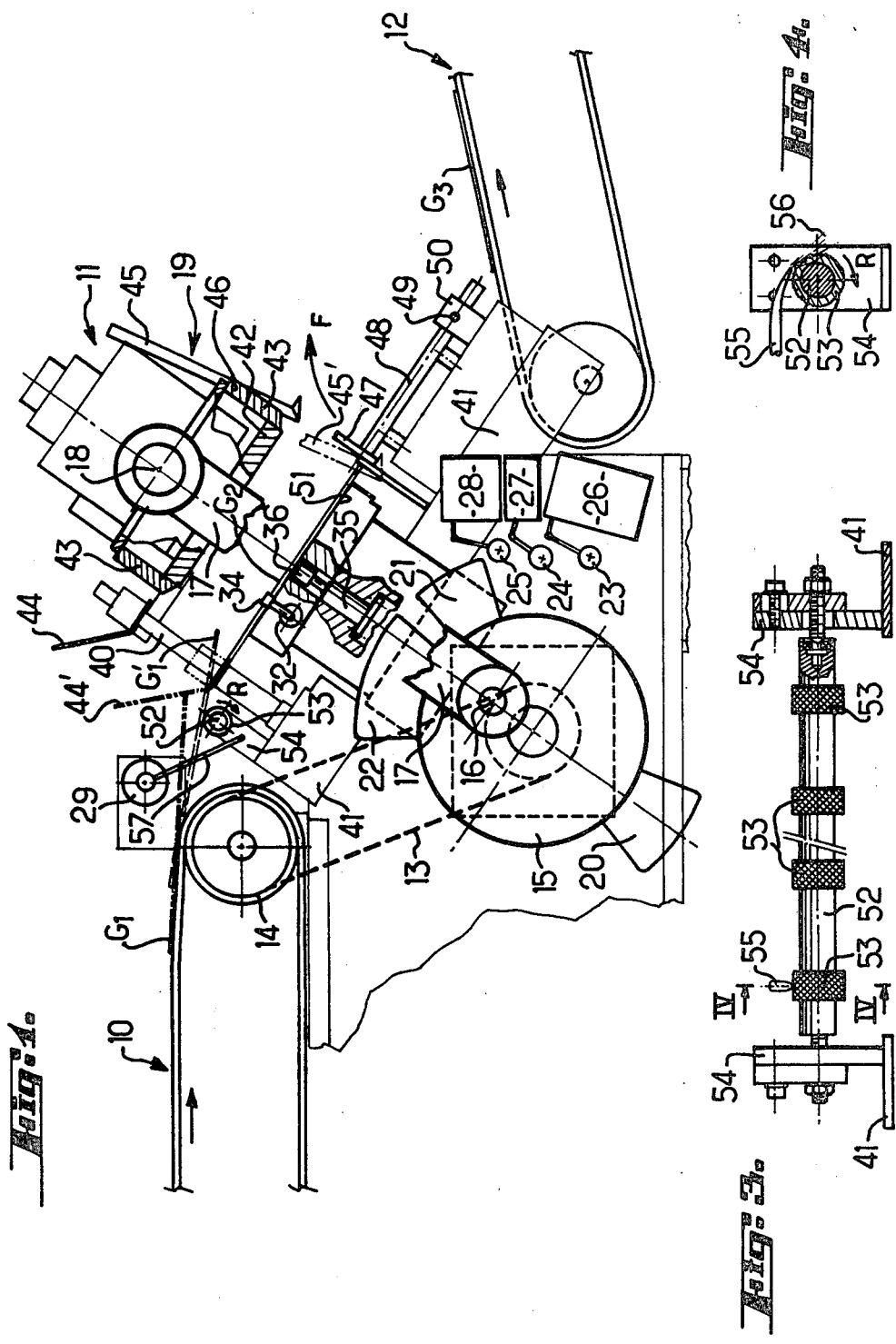

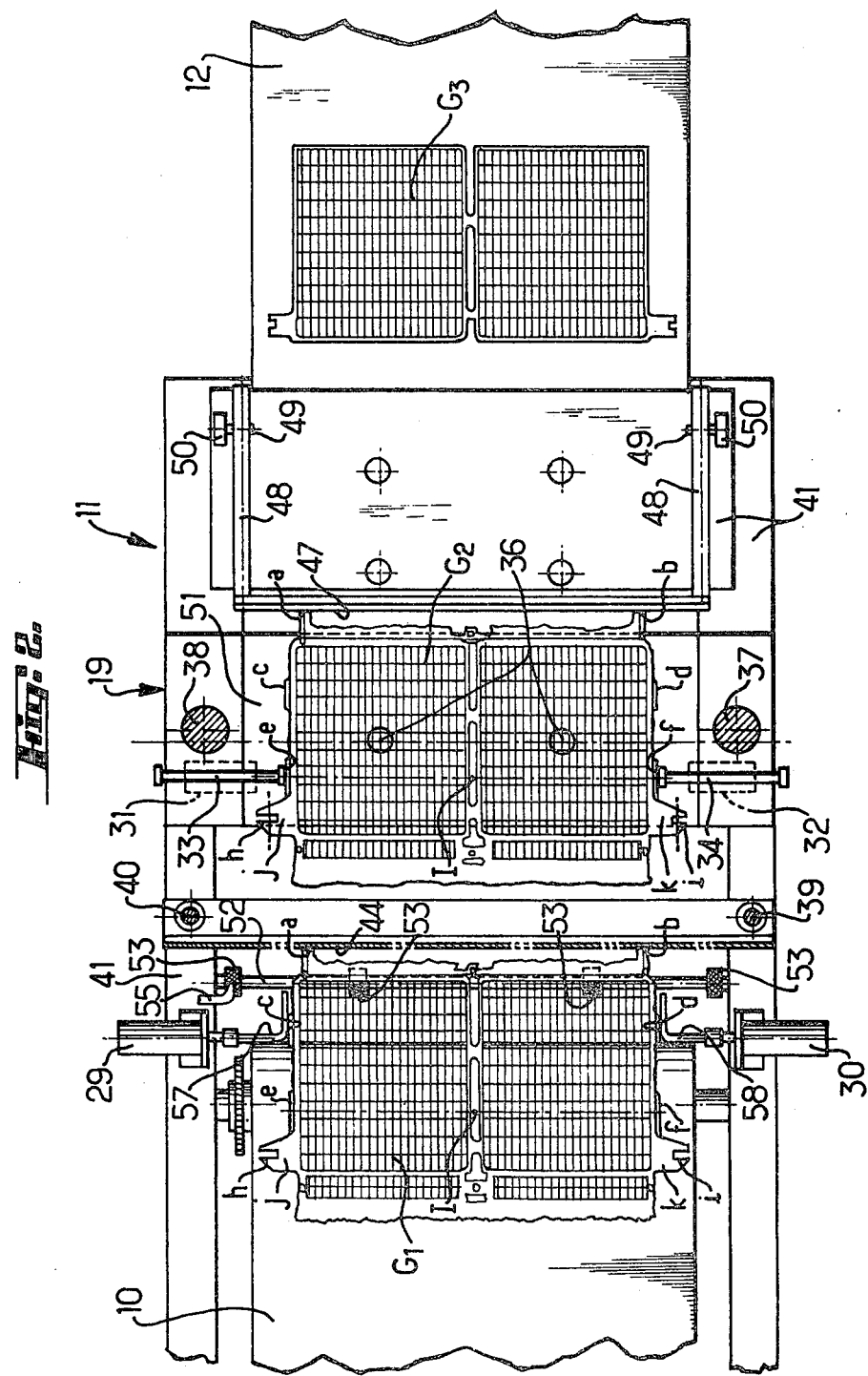

METHOD OF AND MACHINE FOR MANUFACTURING SUPPORT GRIDS FOR STORAGE BATTERY ELECTRODE PLATES

The present invention relates to and has essentially for its object a method of manufacture of grids or plate-supports cast from lead-based metal for use in storage batteries. The invention also relates to a machine for carrying out such a method.

More specifically, the manufacturing method of the invention is of the type wherein a casting is first performed of grid blanks, the periphery of which is irregular and the size greater than that of the grid which it is desired to obtain, and the peripheral portions of the grid are thereafter trimmed off by means of an automatic press so as to obtain the desired clean final contour.

In practice the rate of output of a production line comprising a casting of grid blanks and automatic delivery thereof to a trimming press is limited by the trimming rate of the press which, in the known machines, is very low. The difficulty arises from the fact that the grids cast from lead alloy are heavy and fragile and therefore difficult to be perfectly and quickly positioned in a trimming press. Inaccurate positioning results in unsatisfactory trimming and unacceptably high proportions of rejects. If the grid blanks are acted upon too roughly when attempting to center them correctly they are liable to be either deformed or decentered under the action of the impact to which they are subjected. For this reason, the automatic devices designed hitherto operate with low rates of output.

The invention allows the afore-mentioned difficulties to be overcome and the rate of output of the press to be considerably increased while at the same time improving a quality of the trimmed grids. With a machine according to the invention, the rates of output are of the order of, for example, 40 grids per minute, perfectly trimmed throughout their periphery.

The method according to the invention is characterized particularly in that the press is supplied sequentially from a continuous grid-blank feeding conveyor, ensuring at the same time, possibly after various precentering operations, at least one final lateral centering of the grid blank in the press by the combined action of two pusher members tapping on each side of the grid-blank in a transverse direction passing substantially from the center of mass of the blank.

In this manner, the final centering operation takes place on the press lower table itself by acting transversely on each side of the blank, in a transverse direction passing substantially from the center of mass of the blank, so that during this last centering the blank does not tend to rotate about its centre of mass and so become out of true, which would result in defective trimming.

The precentering is advantageously performed in several successive stages, particularly on the conveyor, and so the grid blank can be perfectly centered in a progressive manner by rapid and slight impulses transmitted thereto, whereas the final centering takes place in the press itself.

The invention also relates to a machine for manufacturing such metal grids, the said machine being characterized in that it comprises:

(a) a conveyor for continuous feeding of grid blanks to a trimming press, (b) means for precentering the grid blanks prior to their introduction into the press, (c) fluid-operated actuators accomodated in the lower plate of the press at each side thereof to perform a transverse centering of the grid blanks in the press, (d) means for ejecting the grids after their trimming in the press, (e) combined conveyor driving and press actuating means, (f) means of sequential control, for example by cams and feelers and pneumatic or electric control, ensuring the following motions in the desired sequence: press closing, grid-blank precentering, press opening, trimmed grid ejection, operation of actuators for lateral centering of the grid blank in the press.

The invention will appear more clearly from the followig description made with reference to the appended drawings wherein:

FIG. 1 is a cross-sectional, broken-away view of the main members of a machine according to the invention, FIG. 2 is a top view of the machine of FIG. 1, with the upper portion of the press removed and the machine shown straightened in the plane of the Figure so that the proportions of the various grids seen in FIG. 2 remain constant, FIG. 3 is a detailed view of the mounting of a roller assisting the feeding motion of the grid blanks from the feeding conveyor to the press, FIG. 4 is a sectional view upon the line IV—IV of FIG. 3.

Reference is first made more particularly to FIGS. 1 and 2, in which there is seen a portion of a machine according to the invention comprising essentially a conveyor 10 for continuously feeding grid blanks G1 to a trimming press 11. In FIG. 2 is seen a grid G3 which has been ejected from the press 11 after being trimmed in the press while being in the position illustrated at G2. The trimmed grid G3 leaves the machine on a conveyor 12.

According to the example illustrated, a motor (not shown) drives by means of a same belt 13 the roller 14 forming the feeding head of the conveyor 10 and a press actuating flywheel 15. On the flywheel 15 is keyed in decentered relationship a pin 16 on which is fitted the lower end of a connecting rod 17 the other end of which is articulated on a pivot pin 18 connected to the press upper plate 19 so as to ensure the sequential opening and closing of the press by raising or lowering the plate 19. The flywheel 15 also carries at its periphery three cams 20, 21, 22 axially shifted from one another. The cam 20 actuates the feeler 23 when moving opposite the same, whereas the cam 21 actuates the feeler 24 and the cam 22 actuates the feeler 25.

Each feeler 23, 24, 25 is associated with a detector 26, 27, 28, e.g. of the electric or pneumatic type. The detector 26 controls the operation of actuators 29, 30, the detector 27 controls the operation of actuators 31, 32 associated with pusher members 33, 34, and the detector 28 controls the operation of actuators 35 connected to ejector push-members 36.

The upper plate of the press is guided in its downward and upward motion along columns 37, 38, 39, 40 secured to the press lower frame 41. The upper plate comprises, about a pressing plate member 42, cutters 43 for trimming the grid blank G2 positioned in the press.

The press upper plate is provided at its front portion with a shield 44 shown in full lines in its upper position and in dash-dotted lines in its lower position at 44'.

With the press upper plate are also associated locks or catches 45 pivoted about a pin 46. In the lowered position of the press the catches 45 move to a position 45' under a stop bar 47 associated with lateral arms 48 pivoted about transverse pins 49 fastened to lugs 50 secured to the frame 41. The stop bar 47 and the arms 48 thus form a frame member articulated on the pivot pins 49 and adapted to be raised in the direction of arrow F during the upward motion of the press upper plate after the catches 45 are brought under the bar 47. Between the head of conveyor 10 and the inclined lower stationary plate 51 of the press is mounted a roller 52 provided with four knurlings 53, the surface of such knurled portions being slightly below the surface of the conveyor (FIG. 1).

As appears more clearly from FIGS. 3 and 4, the roller 52 is mounted on the frame 41 by means of two side lugs 54. The roller is advantageously mounted through the medium of ball bearings and is of light weight, e.g. made from light aluminium alloy.

Moreover, there is provided a small conduit 55 for directing the compressed air 56 onto at least one of the knurled portions 53 to cause the roller to rotate or at least to assist its rotation in the direction of arrow R, i.e. in the grid-blank feeding direction while the grid blanks are moving on the said roller, as will appear in the following.

The main members of the machine having thus been described the operation of the machine will now be explained.

The grid-blanks are continuously fed on the conveyor 10. The feeding speed of the conveyor is synchronized with the operating speed of the trimming press 11 as a result of their interconnection through the driving belt 13.

Assuming that the press is in its lowered position, a grid G1 fed by the conveyor 10 abuts by its reinforced front legs a, b against the shield 44 in its lowered position 44'. This action combined with the continuous feeding motion of the conveyor 10 ensures a first prepositioning of the grid G1 so that its transverse direction is substantially parallel with the transverse direction of the machine. By transverse direction of the machine is meant any horizontal direction perpendicular to the grid feeding direction.

A moment later the actuators 29, 30 come into operation under the action of the cam 20 which, when passing before the feeler 23, brings into action the detector 26 controlling the operation of the said actuators. The actuators 29, 30 are provided with bent rods 57, 58 which, when the actuators are operated, tap on the lateral sides of the grid-blank G1 at reinforced locations c, d of the blank. It will be noted that the points c, d are located along a same transverse direction of the blank and sufficiently towards its front, between the legs a, b and the centre of mass of the blank located substantially at I. On the cam 20 leaving the feeler 23 the centering members 57, 58 retract. A lateral prepositioning of the blank G1 is thus ensured without notable tilting of the blank, owing to the combined action of continuous conveyor feeding motion and stoppage of the blanks with their legs a, b abutting against the shield 44.

A moment later the press upper plate 19 rises together with the shield 44, thus freeing the blank G1. Simultaneously, as will be decribed later, the grid previously trimmed in the press is ejected.

The blank G1 pushed on the conveyor 10 advances and tilts as illustrated at G'1 in FIG. 1 towards the inclined plane 51 of the press stationary plate. The tilting motion of the blank G1 is limited and its feed motion towards the inclined plane 51 is assisted by the roller 52 as the grid rolls on the knurled portions 53 of the roller. The compressed air injected through the conduit 55 favours the feeding and transfer motion of the blank G1 into the press.

The blank falls onto the inclined plane 51 until its legs a, b abut against the stop bar 47 which at that instant is in its lower position.

A moment later the cam 21 actuates the feeler 24 which brings into action the detector 27 controlling the operation of actuators 31, 32. The latter displace the pusher members 33, 34 which are arranged substantially in the plane of the press and, without interfering with its operation, move into engagement with the blank and press on both its mutually opposite reinforced lateral portion e, f, the line e-f passing substantially through the centre of mass I of the blank. This combined action of the lateral pusher members 33, 34 ensure a last and perfect centering of the blank without any risk of tilting.

A moment later the actuators 31, 32 are retracted as well as the pusher members 33, 34 and the press being entirely lowered there first occurs a locking of the blank in the press and then a trimming of its periphery by the cutters 43. The trimmed off peripheral portions are readily separated, especially if care istaken, as illustrated in FIG. 2, to provide two cuts or notches h, i, for example in the tails j, k of the blanks, the said cuts or notches penetrating into the trimming contour as seen on the trimmed grid G3. Thus the outer contour is at least formed of two separable portions which are easily detached.

A moment later the press opens, the upper plate 19 being raised.

Simultaneously, the cam 21 acts upon the feeler 25 which brings into action the detector 28 which operates the actuators 35 which raise the pistons 36 normally retracted in the press lower plate. The pistons 36 form ejectors which raise the trimmed grid.

Simultaneously, the catches 45 associated with the press upper plate 19 have raised the bar 47. The grid freed by the stop bar 47 and ejected by the ejectors 36 slides on an inclined plane following the press stationary plate 51, the trimmed grid being received and discharged at G3 on the conveyor 12.

A moment later the catches 45 release the bar 47 as a result of the rotating motion of the frame formed by the bar 47 and the arms 48. The frame falls to its lower position so that the stop bar 47 is again in position to stop the next grid blank.

The machine is thus ready for a further cycle.

Of course the invention is by no means limited to the form of embodiment described and illustrated, which has been given by way of example only. The invention comprises all technical means equivalent to the means described as well as their combinations, should the latter be carried out according to its gist and used within the scope of the following claims.

I claim:

1. In the method for manufacturing grids or plate supports cast from lead based metals for use in storage batteries wherein the cast is formed as a blank having an irregular periphery and a size greater than that of the grid to be obtained and wherein the casts are sequentially supplied to an automatic press for trimming of the excess, the improvement comprising the steps of positioning said blanks prior to entry into said press by stopping them for a predetermined period of time in abutment against a rectractable crossmember perpendicular to the direction of feeding, thereafter releasing said grid blanks thus positioned and feeding them into said press, longitudinally positioning the grid blanks so fed to said press by stopping them for a second time in abuttment against a retractable transverse bar and laterally centering said grid blanks in the press by intermittantly tapping on the opposite edges of said blank in a transverse direction passing substantially along the center of mass of said blank, and subsequently trimming the peripheral portion of the blank in said press.

2. The method according to claim 1 including the additional step of centering the blank on said conveyor simultaneous with its abutment against the retractable cross member by tapping on the opposite edges thereof.

3. The method according to claim 2 wherein said tapping is located along the central axis of the mass of said blank.

4. The method according to claim 1 wherein said press is provided with a stationary press plate arranged at an incline downwardly from said conveyor and said blank is caused to tilt from said conveyor and slide on said stationary press plate.

5. The method according to claim 4 including the step of causing said blank to move over a roller arranged between said conveyor and said inclined press plate.

6. The method according to claim 5 wherein a stream of air is applied to the lower surface of said blank as it slides over said inclined press plate.

7. Apparatus for trimming cast grid blanks or plates of lead-based metal for use in storage batteries comprising a continuous conveyor for sequentially feeding said blanks in a longitudinal direction of travel to a trimming press comprising a stationary lower press plate and an upper press plate moveable with respect thereto to open and close said press, said lower press plate being inclined downwardly in direction of travel relative to said conveyor for receipt of a blank on opening of said press, a retractable cross member arranged perpendicular to the direction of travel between said conveyor and said lower press plate adapted to arrest the forward movement of the leading blank on said conveyor so as to longitudinally align said blank prior to entry onto said lower press plate, a transverse bar located at the outlet end of said lower press plate perpendicular to the direction of travel to arrest the movement of the blank received on said lower press plate prior to trimming, and fluid actuated means located on each of the longitudinal sides of said press to exert an intermittant tapping force on the blank located on said lower press plate so as to transversely center the blank prior to trimming.

8. The apparatus according to claim 7 wherein said retractable cross member comprises a shield connected to the upper press plate for conjoint movement therewith, said shield being arranged to intersect the plane of said conveyor on closing of said press, and to be removed therefrom on opening of said press.

9. The apparatus according to claim 7 including means for transversely centering said blanks on said conveyor comprising a fluid actuated means located adjacent to each of the sides of said conveyor to exert a tapping force on the opposed edges of said blank.

10. The apparatus according to claim 9 wherein said conveyor and said upper press plate are driven by a common drive means, and said fluid actuated tapping means are actuated by separate valve means, said drive means having a cam coupled thereto for selectively operating said valve means in relationship to the movement of said conveyor and said upper press plate.

11. The apparatus according to claim 7 wherein said transverse bar is mounted on a frame, pivoted about an axis spaced from said transverse bar, means for normally biasing said transverse bar in position adjacent said stationary press plate, and means located on said moveable press plate for engaging said frame and for pivoting said frame out of said position adjacent to said stationary press plate on upward movement of said upper press plate.

12. The apparatus according to claim 7 including a roller interposed between said conveyor and said stationary press plate to assist said blank to move from said conveyor to said press.

13. The apparatus according to claim 12 including air jet means associated with said roller means to assist movement of said blanks.

14. The apparatus according to claim 13 wherein said air jet is mounted with said roller and acts to propel said roller.

* * * * *